(12) United States Patent
Song et al.

(10) Patent No.: US 6,750,407 B2
(45) Date of Patent: Jun. 15, 2004

(54) CONTROL PANEL ASSEMBLY FOR HOME APPLIANCES AND METHOD FOR MANUFACTURING THE SAME

(75) Inventors: Young Han Song, Changwon-shi (KR); Ki Ho Kang, Changwon-shi (KR); Myong Deok Kim, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/362,103
(22) PCT Filed: Jun. 22, 2002
(86) PCT No.: PCT/KR02/01192
§ 371 (c)(1), (2), (4) Date: Feb. 21, 2003
(87) PCT Pub. No.: WO03/001546
PCT Pub. Date: Jan. 3, 2003

(65) Prior Publication Data
US 2003/0150699 A1 Aug. 14, 2003

(30) Foreign Application Priority Data
Jun. 22, 2001 (KR) ......................................... 2001/35937
Jun. 22, 2001 (KR) ......................................... 2001/35939
Jul. 31, 2001 (KR) ......................................... 2001/46404

(51) Int. Cl.$^7$ ................................................ H01H 9/00
(52) U.S. Cl. ........................ 200/5 A; 200/5 R; 200/310
(58) Field of Search ................................. 200/5 R, 5 A, 200/308–317, 512, 517

(56) References Cited

U.S. PATENT DOCUMENTS

| | | | | |
|---|---|---|---|---|
| 5,464,955 A | * | 11/1995 | Cole | 200/317 |
| 5,721,666 A | * | 2/1998 | Girard | 361/627 |
| 6,066,225 A | * | 5/2000 | Lopes | 156/245 |
| 6,080,940 A | * | 6/2000 | Rice | 200/5 A |
| 6,573,463 B2 | * | 6/2003 | Ono | 200/5 A |

FOREIGN PATENT DOCUMENTS

| | | | | |
|---|---|---|---|---|
| DE | 36 30 898 A1 | 4/1988 | | H01H/13/70 |
| EP | 1 022 756 A2 | 7/2000 | | H01H/13/70 |

* cited by examiner

Primary Examiner—Michael A. Friedhofer
(74) Attorney, Agent, or Firm—McKenna Long & Aldridge LLP

(57) ABSTRACT

A control panel assembly for home appliances devised for a better external appearance and more stable operation is disclosed. The control panel assembly includes a substrate (40) provided with at lest one switch (42) for operating home appliance and at least one display element (43) for displaying the operation state, an external film (60) configured to make it possible for an user to access to the switch (42) and the display element (43), and a control panel (30) allowing the substrate 40 to be installed therein, the control panel (30) injection-molded to be inserted in the external film (60) and integrated with the external film (60)

33 Claims, 12 Drawing Sheets

CONTROL PANEL ASSEMBLY FOR HOME APPLIANCES AND METHOD FOR MANUFACTURING THE SAME

BACKGROUND OF THE INVENTION

1. Technical Field

The present invention relates to home appliances, and more particularly, to a control panel assembly for operating the home appliances and displaying an operation state thereof.

2. Background Art

FIG. 1 illustrates a perspective disassembled view of a related art control panel assembly of a home appliance, in which a control panel 1 forms an outside shape of the control panel assembly. The control panel 1 may form one side of the home appliance. The control panel 1 is provided with a plurality of pass through holes 3 and resilient buttons 5 formed therein. The pass through holes 3 are parts for passing lights of LEDs to display operation states of the home appliance, and the resilient buttons 5 are parts for receiving signals for operating the home appliance from the user as a user presses the buttons 5.

The resilient buttons 5 connects to the control panel 1 with a plurality of legs 6, for returning to an original position after the button 5 is pressed owing to resiliency of the leg 6. The resilient button 5 has a lengthy extension to an inside of the control panel 1 for on/off a switch 8 fitted to a substrate 7 to be explained later.

The substrate 7 is fitted to an inside of the control panel 1. The substrate 7 has the switch 8 for receiving signals for operating the home appliance, components, such as LED for displaying operation states of the home appliance, and supporters 9 for supporting the LED and guiding lights. There are components other than above. The switch 8 is fitted at a position opposite to the resilient button 5, and the LED is fitted to a position opposite to the pass through hole 3.

Next, there is a window panel 10 welded to a surface of the control panel 1. The window panel 10 has pass through holes 12 in positions opposite to the resilient buttons 5 and the pass through holes 3 in the control panel 1. The pass through holes 12 opposite to the resilient buttons 5 are for permitting the user to press down the resilient buttons 5, and the pass through holes 12 opposite to the pass through holes 3 are for permitting the lights of the LEDs to pass outside.

In the meantime, there is a window film 15 fitted to a surface of the window panel 10. The window film 15 fitted to the window panel 10 prevents infiltration of foreign matters and moisture into an inner part. There are buttons 17 projected from positions opposite to the resilient buttons, and indicating parts 18 at positions opposite to the pass through holes 12 for indicating operation states of the home appliances. There are characters, or graphics on the buttons 17 and the indicating parts 18 for indicating functions or operations, or the like.

In the foregoing related art control panel assembly for home appliances, the window film 15 is fitted to the window panel 10, and the window panel 10 with the window film 15 fitted thereto is welded to the control panel 1. The substrate 7 is seated on an inside of the control panel 1.

Once the control panel assembly is assembled, the buttons 17 on the window film 15 are located opposite to the resilient buttons 5 of the control panel 1 through the pass through holes 12, such that when the buttons 17 are pressed, the resilient buttons 5 are pressed, to operate the switch 8 on the substrate 7.

The lights from the LEDs on the substrate 7 are transmitted through the pass through holes 12 opposite to the indicating parts 18 on the window film 15 and the pass through holes 3 in the control panel 1. The lights from the LED are guided by the supporters 9. Once the lights from the LEDs illuminate the window film 15, operation states of the home appliances are indicated in association with the indicating part 18.

However, the foregoing related art control panel assembly has the following problems.

First, the related art control panel assembly, provided with the control panel 1, the substrate 7, the window panel 10, and the window film 15, has relatively many number of components, to require individual fabrication of the components, that increases a production cost, and causes assembly work of the components poor.

Moreover, the foregoing related art control panel assembly has a plurality of the supporters 9 separated from one another for supporting the LEDs and guiding the lights thereof The plurality of supporters 9 are provided for smooth interaction between the switches 8 each fitted between the LEDs and the resilient buttons 5 on the control panel 1.

However, this configuration fails to provide a robust fitting state of the supporters 9, because the supporters 9 cannot but be fixed to a level at which lower parts of the supporters 9 are inserted in the substrate 7 respectively, and held by one urethane coating. This construction cannot transmit the lights of the LEDS guided by the supporters 9 to the indicating parts 18, accurately.

In addition to this, since (he resilient buttons 5 are on (lie control panel 1, operation of the switches 8 by the resilient buttons 5 may not be made exactly if the assembly between the control panel 1 and the substrate 7 are accurate.

In the meantime, one of resilient buttons 5 on the control panel 1 provided adjacent to one another may be pressed by mistake on the occasion of pressing an adjacent one, to cause a problem that adjacent switches 8 are pressed on the same time.

Since the window film 15 is fitted to cover the window panel 10 only, there is a danger of water infiltration into an inner part through a gap between the control panel 1 and the window panel 10, the control panel 1 does not look elegant since the control panel 1 has one part of the window film 15 fitted thereto and the other part of the window film 15 not fitted thereto, and which further causes a problem of a difference of discoloration between the part the window film 15 is fitted thereto and the other part the window film 15 is not fitted thereto when the control panel 1 is used for a long time.

SUMMARY OF THE INVENTION

Accordingly, an object of the present invention designed for solving the foregoing problem is to provide a control panel assembly of a simple construction.

Another object of the present invention is to provide a control panel assembly having an improved outside look.

A further object of the present invention is to provide a control panel assembly which permits no infiltration of foreign matters into an inner part thereof Still a further object of the present invention is to provide a control panel assembly which shows no discoloration even if the control panel assembly is used for a long time period.

The object of the present invention can be achieved by providing a control panel assembly for home appliances including a substrate for fitting switches and indicators for operating at least one or more than one home appliance and indicating operating states of the home appliance respectively, an outside film formed such that a user can access the switches and the indicators, and a control panel injection molded so to be inserted in, and unitized with, the outside film having a substrate fitted to an inside thereof.

Preferably, the control panel assembly further includes an intermediate frame for connecting the outside film to the switches/indicators such that the outside film interacts with the switches/indicators.

The intermediate frame includes at least one intermediate button for driving the switch, and at least one supporter for supporting the indicators and guiding indication of the indicators.

The intermediate frame further includes reinforcing ribs formed between adjacent intermediate buttons.

In another aspect of the present invention, there is provided a method for fabricating a control panel assembly for home appliances, including the steps of (a) forming an outside film such that a user can put the home appliance into operation and know an operation state, (b) injection molding resin in the outside film, to form the control panel as one unit with the outside film, and (c) fitting the control panel unitized with the outside film to a substrate, such that the outside film can interact with the switches and the buttons fitted on the substrate.

The step (a) includes the steps of (aa) printing graphics or characters on a raw film for indicating operations and operation states, and (ab) forming the printed film to be in conformilty with a predetermined outside form by heat.

The step (ab) includes the steps of placing the printed film in a mold having a forming surface of a required form, applying heat and pressure to the film such that the film is brought into close contact with the forming surface, maintaining a pressure in the mold for a time period for forming the film to a form opposite to the forming surface, and separating the formed film from the mold.

The step (b) includes the steps of (ba) placing the formed film in a first mold having recesses opposite to a form of a front surface of the formed film, (bb) coupling a second mold opposite to the first mold with the first mold having the film placed therein, to form a forming cavity between the first mold and the second mold, (bc) injecting resin into the forming cavity, and (bd) removing a control panel from the mold, the control panel being formed as the resin is set as one unit with the film.

Thus, the present invention can improve the quality of an outside look of the control panel, prevent infiltration of foreign matters into the control panel assembly, and permits easy assembly of the control panel assembly.

BRIEF DESCRIPTION OF DRAWINGS

The characters and advantages of the present invention can be better understood with reference to the attached drawings, together with the detailed description of the present invention.

In the drawings:

FIGS. 5A–5D illustrate perspective views showing the steps of a method for thermal formation of an outside film in accordance with a preferred embodiment of the present invention.

BEST MODE FOR CARRYING OUT THE INVENTION

A control panel assembly for home appliances in accordance with preferred embodiments of the present invention will be explained with reference to the attached drawings.

Figure 1:
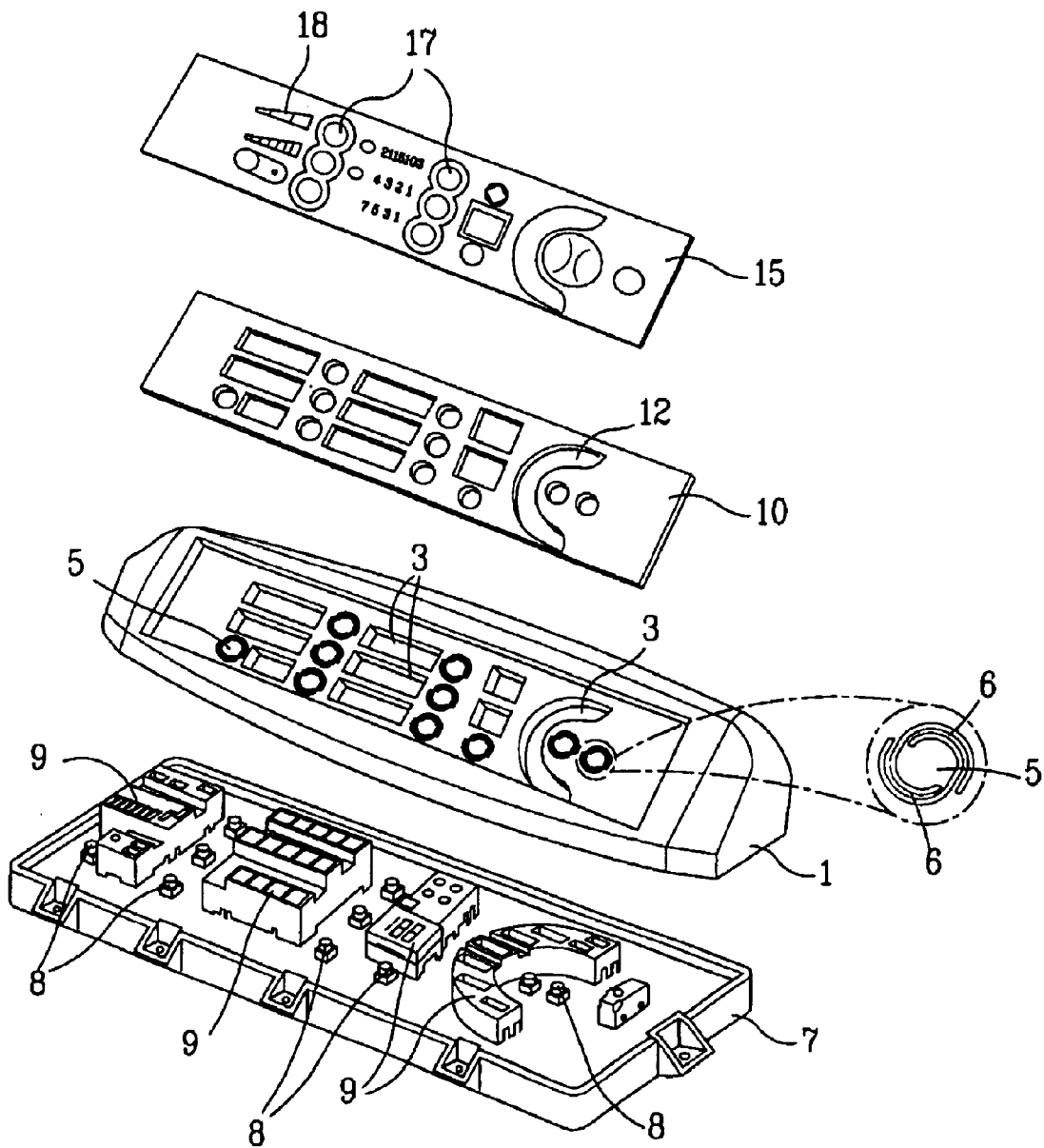
FIG. 1 illustrates a perspective disassembled view of a related art control panel assembly for home appliances.
Figure 2:
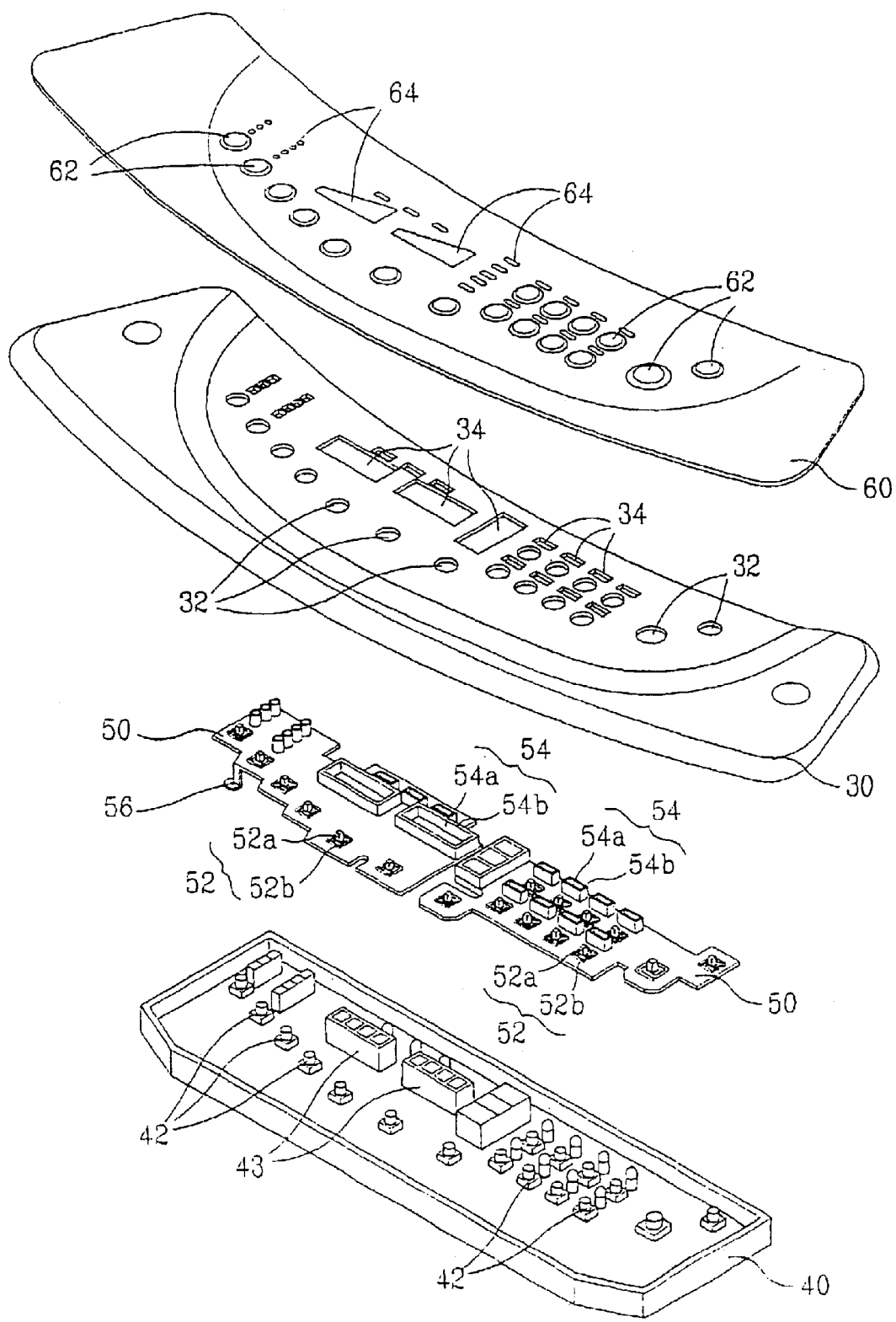
FIG. 2 illustrates a perspective disassembled view of a control panel assembly for home appliances in accordance with a preferred embodiment of the present invention.
Figure 3:
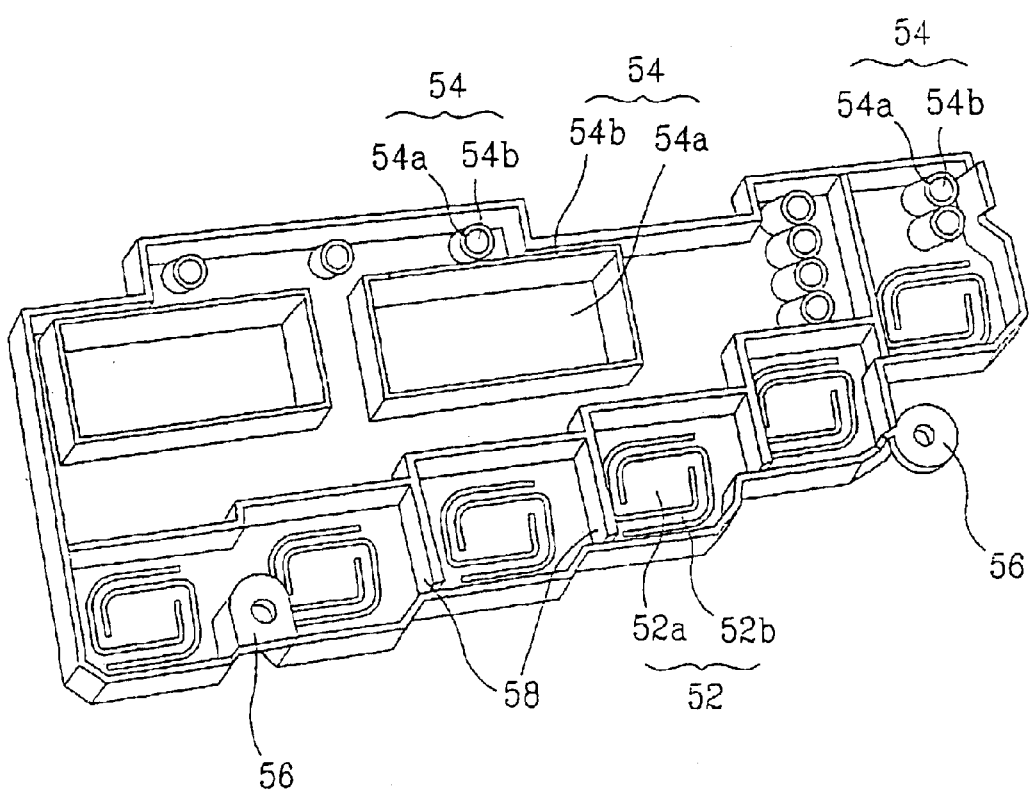
FIG. 3 illustrates a perspective view of a bottom of an intermediate frame of a control panel assembly in accordance with a preferred embodiment of the present invention.

FIG. 2 illustrates a perspective disassembled view of a control panel assembly for home appliances in accordance with a preferred embodiment of the present invention, and FIG. 3 illustrates a perspective view of a bottom of an intermediate frame of a control panel assembly in accordance with a preferred embodiment of the present invention.

Though the control panel of the present invention is applicable to all kinds of home appliances, the following embodiment explains application to a washing machine.

As shown, the control panel of the present invention includes a control panel 30, a substrate 40 fitted to the control panel 30, and an outside film 60 fitted to a front surface of the panel 30.

Referring to FIG. 2, the control panel 30 forms an outside shape of a control panel assembly. The control panel 30 is injection molded so to be inserted in the outside film. That is, the control panel 30 is formed as a unit with the outside film 60. Thus, since the control panel 30 and the outside film 60 are unitized actually, a number of components to be assembled in a fabrication process are reduced relatively, and a design uniformity of the control panel 30 can be maintained. Moreover, the outside film 60 protects the control panel 30, an injection molded product, from discoloration.

The control panel 30 has at least one button pass through holes 32, at position opposite to switches 42 on the substrate 40 to be explained later. Along with this, at least one indicating pass through holes 34 is formed in the control panel 30, at positions opposite to indicators 43 on the substrate 40. The control panel 30 is formed of a transparent, or semi-transparent material for improvement of an outside look, preferably of ABS (Acrylonitrile Butadiene Styrene).

The substrate 40 forms a bottom of the control panel assembly of the present invention, and supports various components fitted in the assembly. The switches 42, components for operation of the home appliances and indicators 43, components for indicating operation states of the home appliances are fitted on the substrate 40. The switches 42 provides signals required for operation of the home appliances, and the indicators 43 may be LEDs (Light Emitting Diode), LCD (Liquid Crystal Display), or the like.

Especially, when the control panel assembly of the present invention is applied to a washing machine, water proofing is more important than anything else. Therefore, it is preferable that a water proof layer 40a is formed on the substrate 40 for preventing the switches 42 and the indicators 43 from coming into contact with water. The water proof layer is in general formed of urethane, mostly.

As explained, the outside film 60 is unitized with the control panel 30, basically. The outside film 60 covers all the front surface 30a for improvement of an outer look and prevention of discoloration of the front panel 30. Preferably, the outside film 60 has a continuous surface having no holes for prevention of infiltration of water and other foreign matters into the substrate 40.

The outside film 60 is formed such that a user can access the switches 42 and the indicators 43, i.e., the user can operate the switches 42 or can obtain information from the indicators 43. For this, the outside film 60 includes buttons 62 formed opposite to the switches 42 and indicator windows 64 formed opposite to the indicators 43. In this instance, the buttons 62 have projected from a surface of the outside film 60 opposite to the switches 42 so as to put the switches 42 into operation when the user presses the buttons 62. The indicator windows 64 have the lights from the indicators 43 provided thereto through the indicating pass through holes 34. If the control panel 30 is formed of transparent, or semi-transparent material, the lights from the indicators 43 can be provided to the indicator windows 43 directly even if there are no indicating pass through holes 34.

The outside film 60, particularly the buttons 62 and the indicator windows 64, may have characters, graphics, or colors printed thereon for assisting a user's use of the home appliances. Moreover, though the buttons 62 may be formed to be transparent for providing various designs, the transparent buttons 62 do not provide a good look of the control panel assembly, because an inside of the control panel assembly can be seen through the transparent buttons 62. Therefore, it is preferable that finishing members are fitted to rear of the transparent buttons 62 additionally for preventing the inside of the control panel assembly from being seen through the transparent buttons 62. The finishing member may have a color, a character, or a graphic printed thereon for display through the transparent button 62.

In the meantime, though the outside film 60 (i.e., the buttons 62 and the indicator windows 64) may be directly connected to, and interact with, the switches 42 and the indicator 43, it is more preferable that an intermediate film is provided between the outside film 60 and the switches 42/the indicators 43 additionally for more stable operation. The intermediate frame 50 connects the outside film 60 to the switches 42/the indicators 43 so as to interact with each other.

In more detail, the intermediate frame 50 has intermediate buttons 52 for driving the switches 42. As shown, the intermediate buttons 52 has a body 52a extended for a length, and a leg 52b for connecting the body 52a to the intermediate frame 50. The body 52a is actually projected from the intermediate frame 50, with a bottom thereof in contact with the switch 42, and a top thereof positioned in the button pass through hole 32 of the control panel 30. The leg 52b makes the body 52a operative resiliently by a force provided to the body 52a. That is, whenever the force is provided to the intermediate buttons 52, the leg 52b is deformed resiliently to press the body 52a down, to turn on/off the switch 42. When the force is removed, the leg 52b is restored, to restore the body 52a to an original position, too. As shown, it is preferable that the leg 52b is a spiral member for having an appropriate elastic force.

The intermediate frame 50 also has supporters 54 formed as one unit. The supporter 54 has an opening 54a opposite to the indicator 43, and a wall 54b extended in a vertical direction from a circumference of the opening 54a. That is, as shown the supporter 54 has a form of channel actually. According to this, it is preferable that a bottom of the wall 54b is seated on the substrate 40 for more stable supporting of the indicator 43. A top of the wall 54b serves to guide a light from the indicator 43 to the indicator window 64, together with the opening 54a.

The intermediate frame 50 has a plurality of fastening parts 56, for fastening the intermediate frame 50 to the substrate 40. The fastening parts 56 may be fastened by screws.

As explained, unlike the related art, the present invention suggests unitization of the intermediate buttons 52 and the supporters 54. According to this, a number of entire components are reduced, and required man power is also reduced. Moreover, since the intermediate frame 50 is fastened to the substrate 40 by the fastening parts 56, bottoms of the supporters 54 are supported on the substrate 40, and the intermediate frame 50 is supported on the substrate 40 firmly on the whole. According to this, when the intermediate buttons 52 are pressed down, the switches 42 can be operated exactly, and the supporters 54 can also guide lights from the indicators 43 to the indicator windows 64, exactly.

In the meantime, a plurality of the legs 52b in the intermediate frame 50 may weaken a strength of the intermediate frame 50, such that an adjacent button may be moved when one of the intermediate buttons 52 are pressed. For preventing this, the intermediate frame 50 is provided with a reinforcing rib 58 between every adjacent intermediate buttons 52. Referring to FIG. 3, the reinforcing rib 58 may be formed on a back surface of the intermediate frame 50, or, though not shown, may be formed on a front surface of the intermediate frame 50. The reinforcing frame 58, seated on the substrate 40, serves to support the intermediate frame 50. The reinforcing rib 58 reinforces strength of the intermediate frame 50. Therefore, when one of the intermediate buttons 52 is pressed, no other intermediate buttons 52 are pressed, thereby preventing malfunction of the home appliances.

Though the intermediate frame 50 is divided into two parts in this embodiment, the intermediate frame 50 may be fabricated as one unit depending on a design condition.

A method for fabricating a control panel assembly of the present invention will be explained.

At first, an outside film 60 is prepared such that a user can operate a home appliance and understand operation state thereof.

Figure 4A:
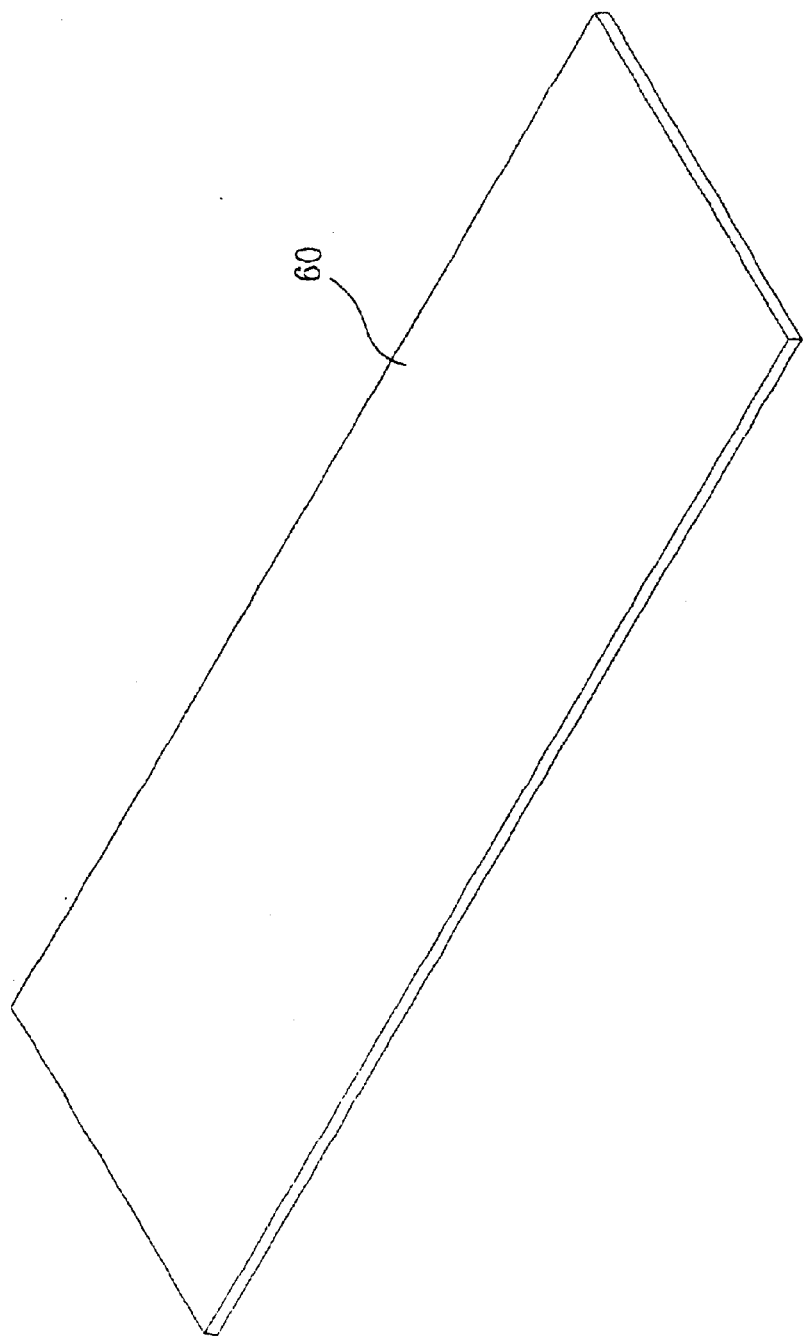
FIGS. 4A–4D illustrate perspective views showing the steps of a method for fabricating an outside film in accordance with a preferred embodiment of the present invention.

FIG. 4A illustrates a raw film state of an outside film 60. The raw film is formed of PET (Polyethylene Terephthalata) or PC (Polycarbonate). Graphics or characters are printed in a surface of the raw film for indicating operation states of the home appliances. Particular color is painted on the surface of the outside film 60 on the same time with the printing of the graphics or characters. For an example, the surface of the outside film 60 is painted with a color the same with a color of the top cover or a door part located in the vicinity of the control panel assembly, or may be painted with a particular color depending on a design of the home appliances.

Figure 4B:
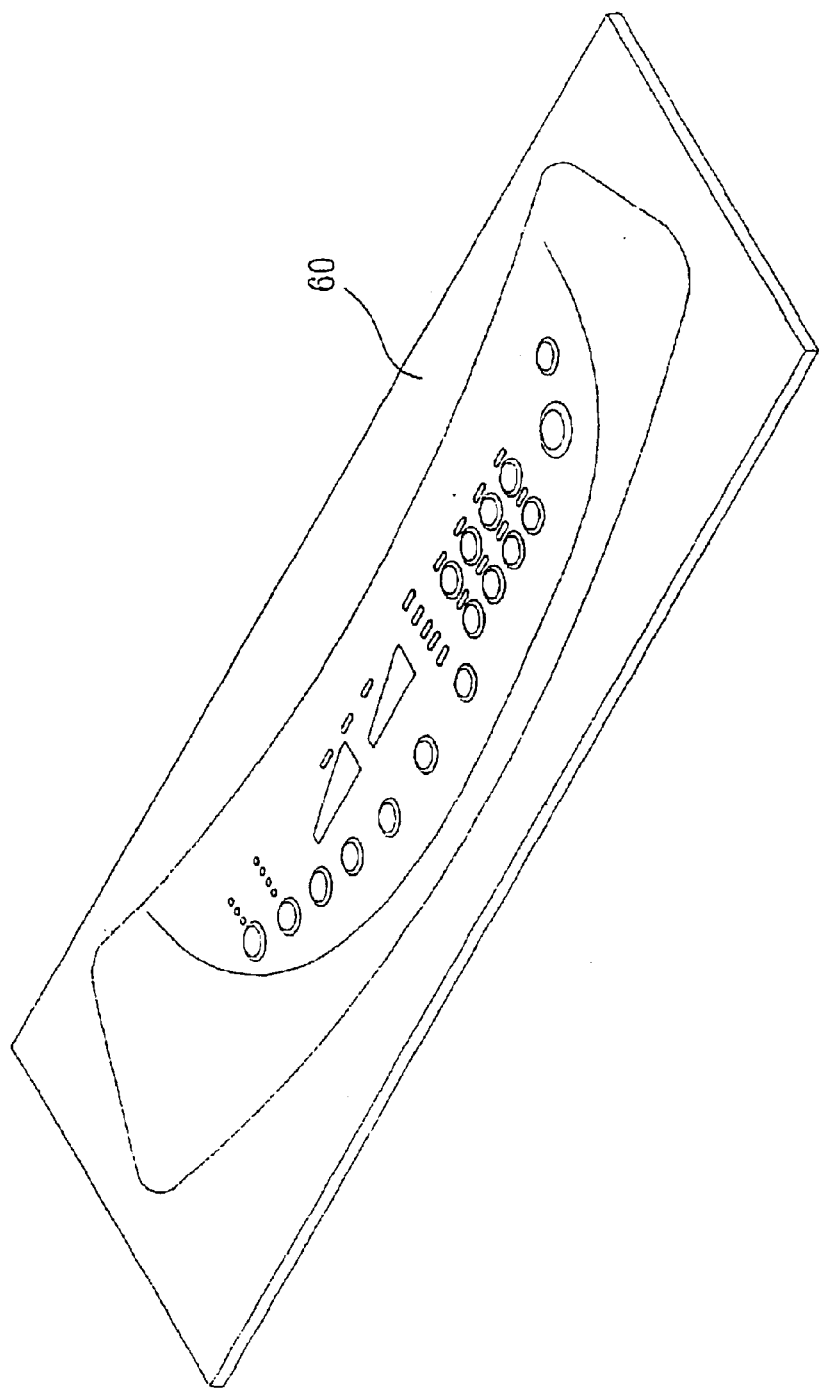

FIG. 4B illustrates a state a ground color is painted on a surface of the outside film 60, and a graphic or characters are printed thereon. A part the ground color is painted is an area indicated with a dashed line, which is an approx. outline of the outside film 60. In the meantime, the graphic or characters on the outside film 60 is printed taking deformation in a thermal formation process, a next process, into account. That is, the graphic of characters are printed so as to indicate an intended shape after the outside film 60 is deformed in the thermal formation. For an example, if a final graphic is a circle, the graphic may be printed in an elliptical form.

Figure 5A:
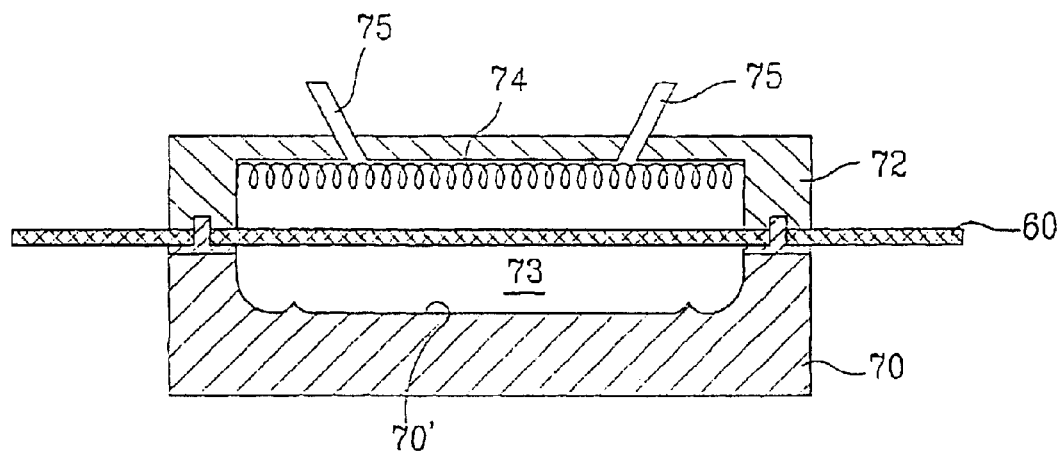
Figure 5B:
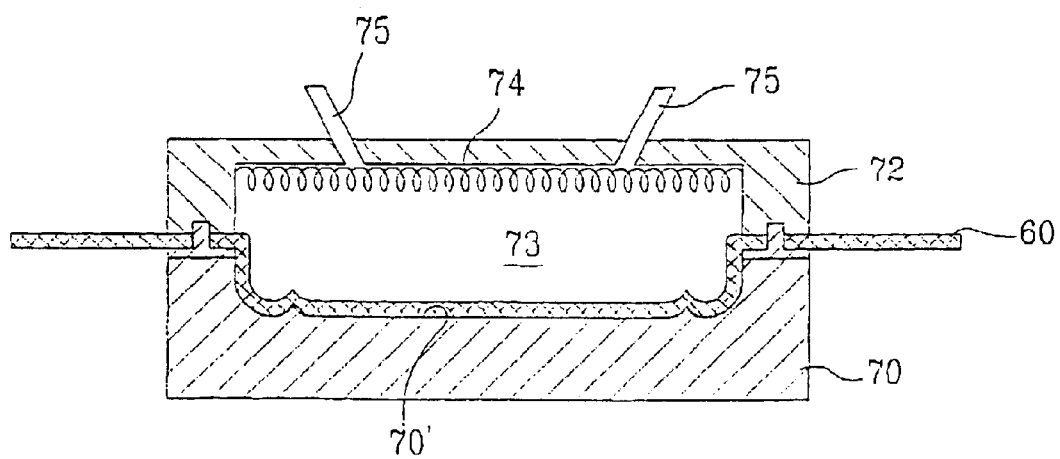

Next, the printed film 60 may be subjected to thermal formation, to obtain a required shape. Referring to FIG. 5A, in this thermal formation step, the printed film 60 is placed in a cavity 73 formed by a first mold 70 and a second mold. In this instance, edges of the outside film 60 are projected outside of the molds 70 and 72.

In this state, heat and pressure is applied to the printed film 60. In more detail, the film 60 is heated by a heat coil 74 provided to the second mold 72. Then, compressed air is blown into the cavity 73 through a compressed air injection hole 75, to apply pressure to the film 60. As shown in FIG. 5A, as a pressure inside of the cavity 63 becomes higher, the heated outside film 60 comes into close contact with the surface 70' of the first mold 70.

Figure 4C:
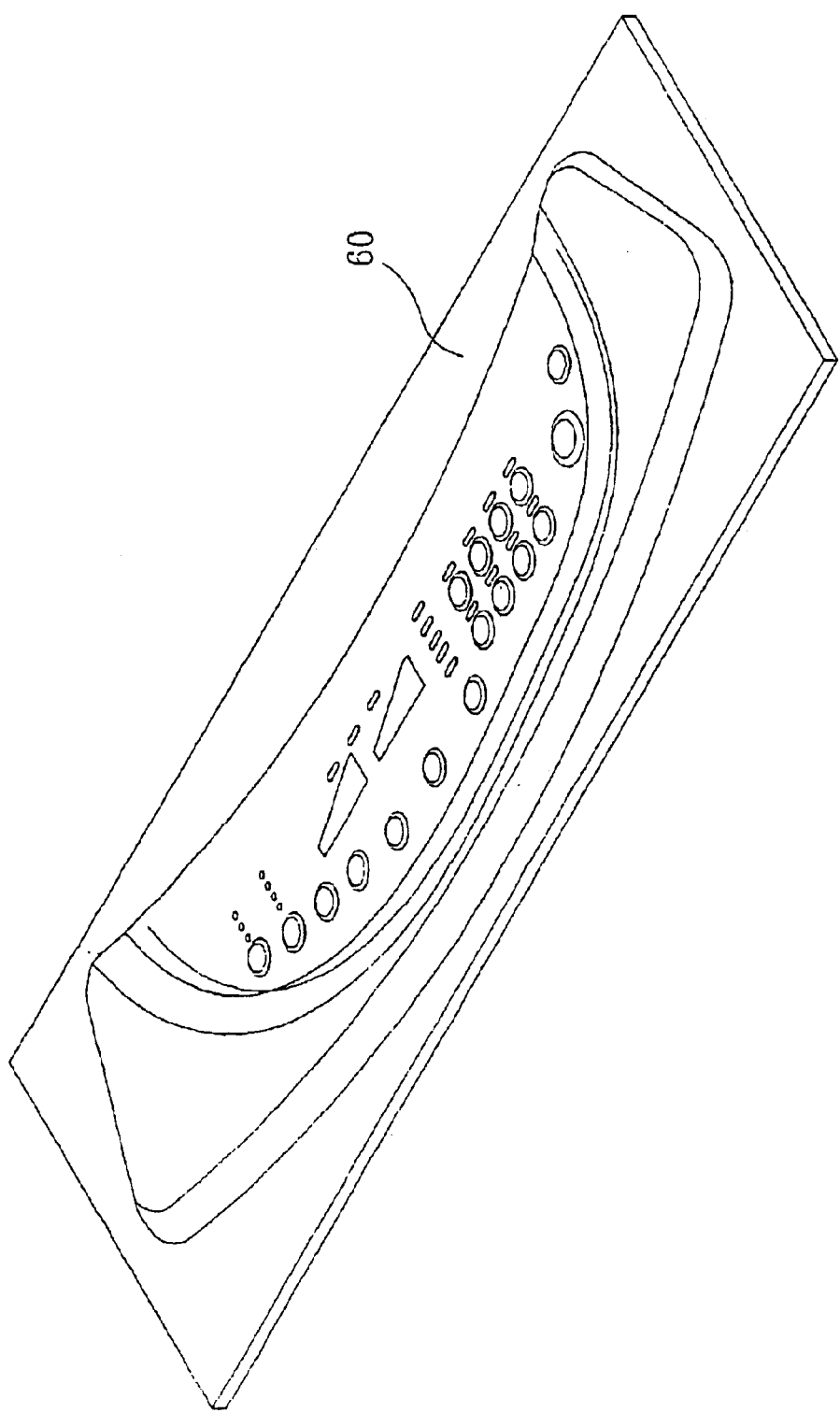

Then, the state the heated outside film 60 is in close contact with the surface 70' of the first mold 70 is maintained for a preset time period, such that the outside film 60 takes a shape corresponding to the surface 70', i.e., a preset desired form. The buttons 62 projected from a surface of the outside film 60 are formed by the surface 70' on the same time as shown in FIG. 4C. Upon finishing the formation, the first mold 70 and the second mold 72 are separated, and the formed outside film 60 is taken out.

Figure 4D:
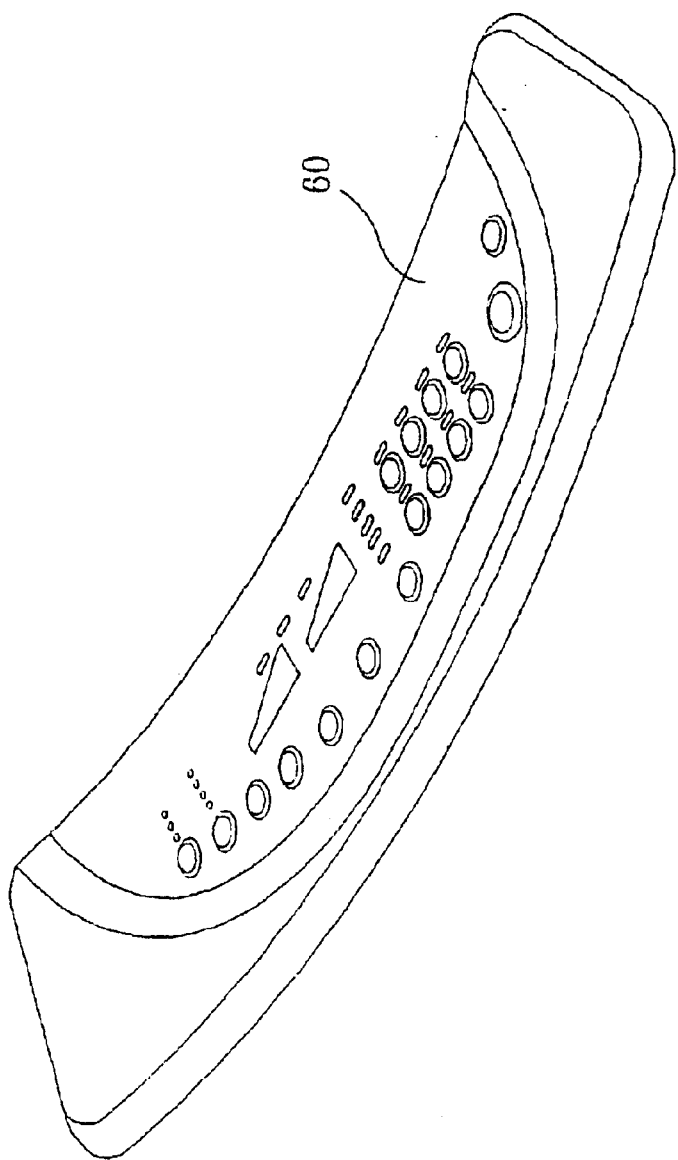

Then, additionally, the outside film 60 is trimmed to obtain a completed outside film 60 as shown in FIG. 4D.

Upon finishing a step of formation of the outside film, resin is injected so as to be inserted in the outside film 60, to form a control panel 30 as a unit with the outside film 60. A series of steps of a method for forming the control panel 30 will be explained, with reference to FIGS. 6A–6D.

Figure 6A:
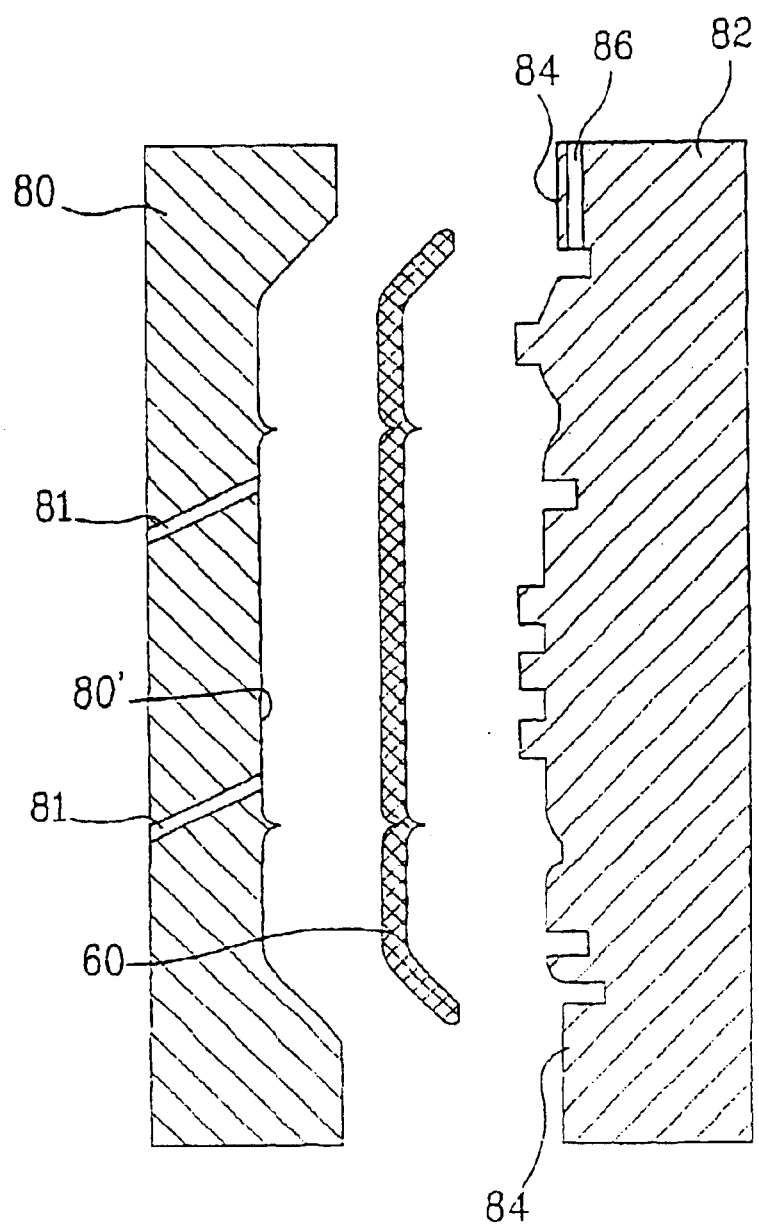
FIGS. 6A–6D illustrate perspective views showing the steps of a method for fabricating a control panel in accordance with a preferred embodiment of the present invention.

At first, referring to FIG. 6A, the formed outside film 60 is placed in the first mold 80 having a recess 80' in conformity with the outside film 60. The first mold 80 has extraction holes 81 extended for outside of the first mold 80 to the recess 80'. By extracting air through the extraction holes 81, a vacuum is formed between the recess 80' and the placed film 60, to fix the outside film 60 on the recess 80' firmly accordingly.

Figure 6B:
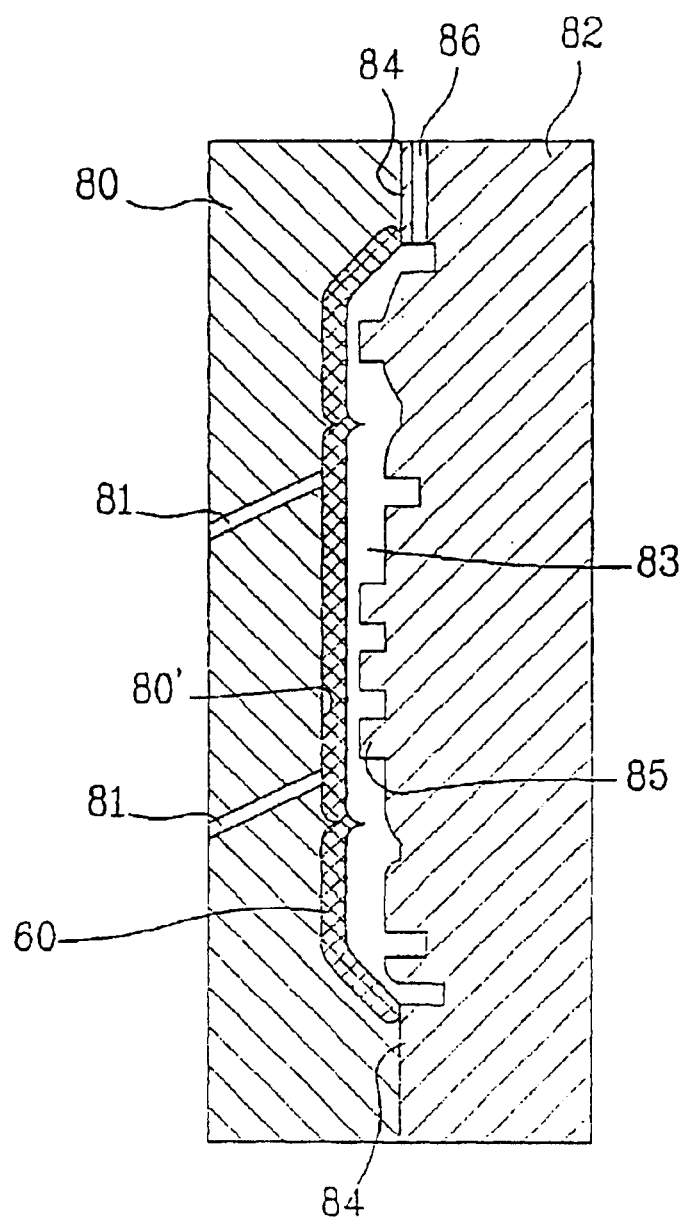

Next, referring to FIG. 6B, a second mold 82 having a form substantially in conformity with the recess 80' in the first mold 80 is coupled with the first mold 80. This coupling provides a formation cavity 83 between the first mold 80 and the second mold 82. As shown, the second mold 82 has a plurality of projections 85 for forming the buttons and indicating holes 32 and 34, which are opposite to the buttons 62 and the indicator windows 64 of the outside film 60 formed before, respectively. Moreover, when the first and second molds 80 and 82 are coupled, an edge of the outside film 60 is supported on a supporting edge 84 of the second mold 82, so that the outside film 60 is placed in the recess 80' of the first mold 80, correctly.

Figure 6C:
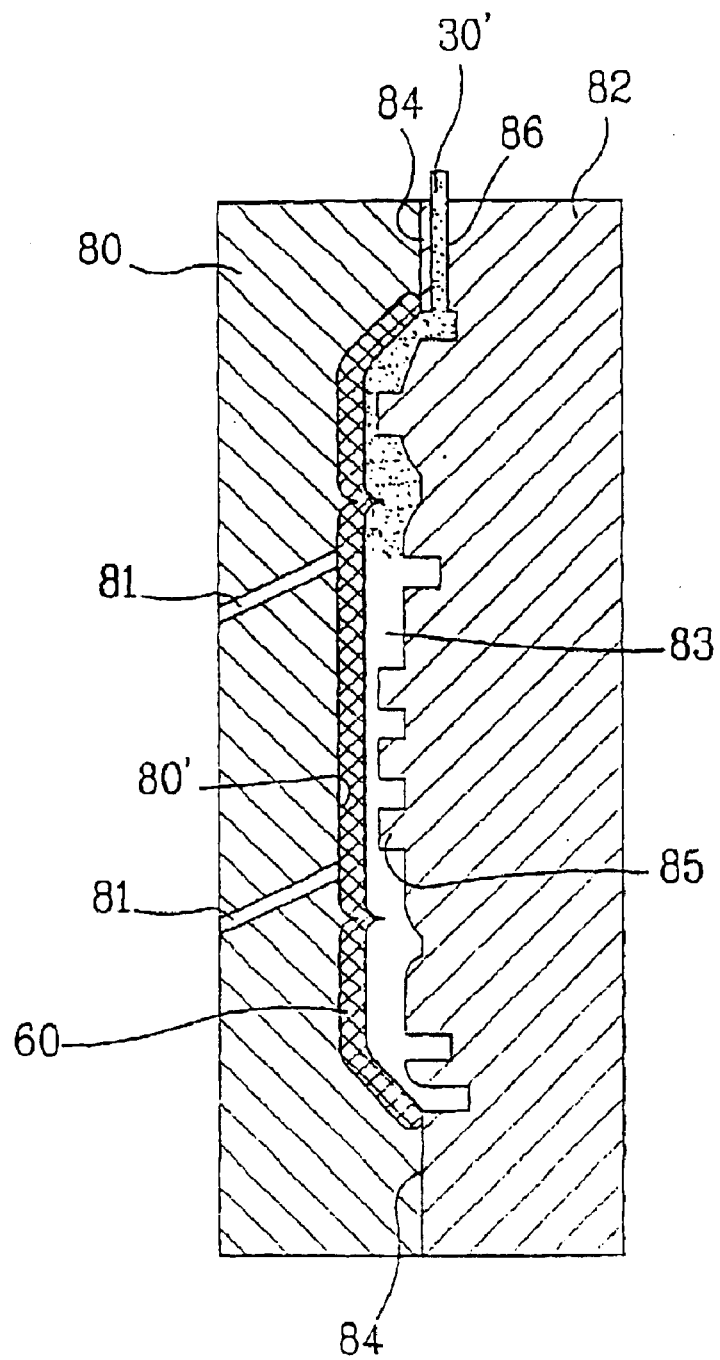
Figure 6D:
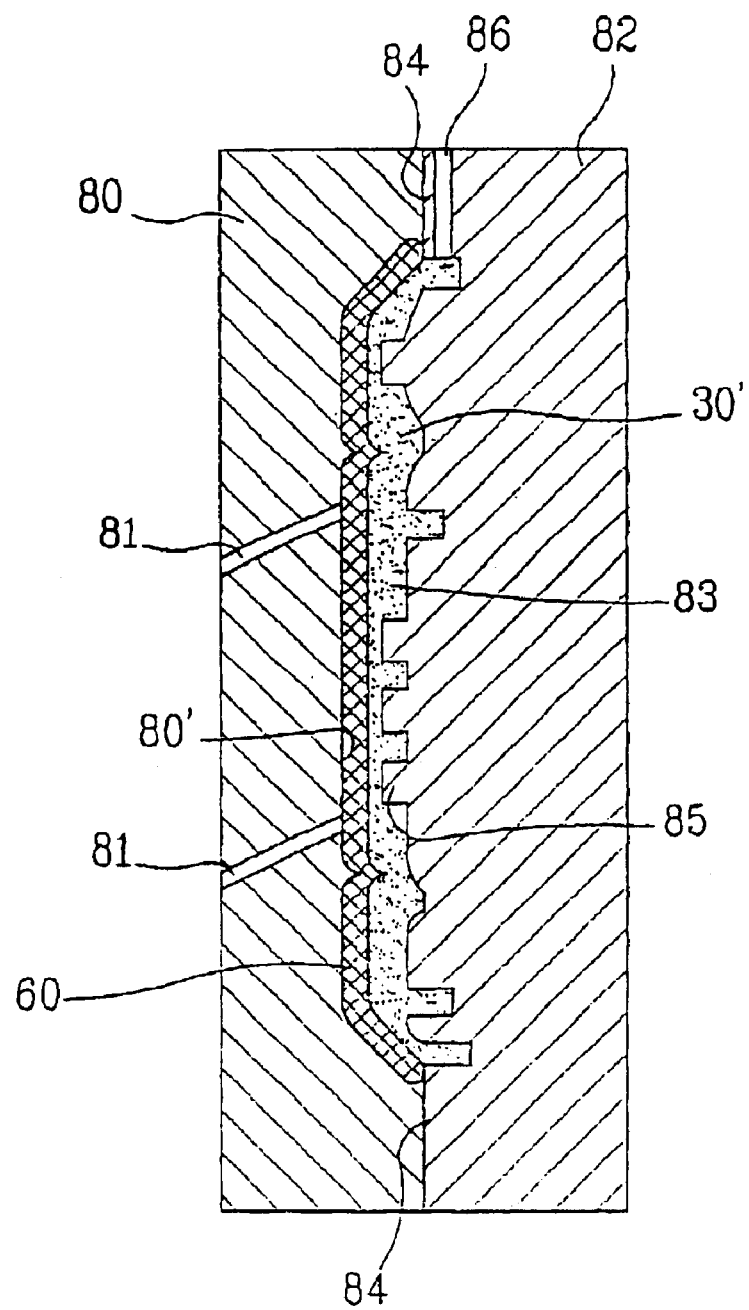

Then, referring to FIG. 6C, resin 30' is introduced into the formation cavity 83 between the molds 80 and 82 through the injection hole 86 for forming a control panel 30. FIG. 6D illustrates a state the resin 30' is introduced into the formation cavity 83, fully. The resin 30' is not introduced to a part of the formation cavity 83 corresponding to the buttons 62 and the indicator windows 64 of the film 60 owing to the projections 85 from the second mold. The resin 30' may be formed of transparent, or semi-transparent ABS for improvement of an outside look. Moreover, when the resin 30' has a melting point higher than the outside film 60, the outside film 60 may be deformed when the resin 30' is injected into the formation cavity 83. Therefore, it is preferable that the resin 30' has a melting point lower than the outside film 60. When a certain time period has passed after the resin 30'0 is introduced, the resin 30' is set to become the control panel 30, when the outside film 60 is inserted to the control panel 30 as one unit.

Upon finishing formation of the control panel 30, the unitized outside film 60/the control panel 30 is fitted to the substrate 40. In the fitting, the buttons 62 and the indicator window 64 are respectively disposed opposite to the switches 42 and the indicators 43, for good interaction through the button pass through holes 32 and the indicating pass through holes. That is, when the button 62 is pressed, the switch 42 is pressed, to put the home appliance into a designated operation. The information on operation state indicated by the indicator 43 is displayed on the indicator window 64 through the indicating pass through hole 43.

If the intermediate frame 50 is employed, the intermediate frame 50 is fitted to the substrate 40 before the control panel 30 and the substrate 40 are assembled. In more detail, the intermediate buttons 52 connect the buttons 62 and the switches 42, and the supporters 54 connect the indicator windows 64 and the indicators 43. Accordingly, when the user presses the button 62, a relevant switch 42 is operated exactly by the intermediate button 52. Also, information on the indicator 43 is transmitted to the indicator window 64 more clearly through the supporter 43 and the indicator window 64. That is, the intermediate frame 50 primarily assures operative stability of the control panel assembly.

The intermediate frame 50 is fastened to the substrate 40 by the fastening parts 56, such that the reinforcing ribs 58 and the supporters 54 on the intermediate frame 50 are supported on the substrate 40. Eventually, the firm fastening of the intermediate frame 50 to the substrate 40 permits exact operation of the intermediate buttons 52 and the supporters 43, thereby enhancing an overall operative stability.

It will be apparent to those skilled in the art that various modifications and variations can be made in the control panel assembly for home appliances of the present invention without departing from the spirit or scope of the invention. Thus, it is intended that the present invention cover the modifications and variations of this invention provided they come within the scope of the appended claims and their equivalents.

INDUSTRIAL APPLICABILITY

As has been explained, the control panel assembly for home appliances of the present invention can reduce a number of components relatively, thereby improving workability of an assembly Work.

The unitization of the intermediate buttons and the supporters with the intermediate frame in fitting to the substrate permits exact guidance of lights of the indicators and exact interaction of the intermediate buttons and the switches, thereby enhancing an operative reliability of the control panel assembly.

In the meantime, the outside film inserted in a front surface of the control panel prevents infiltration of foreign matters into an inside of the control panel effectively, and improves an outside look of the control panel assembly, and prevents discoloration of the control panel, an injection molded product.

What is claimed is:

1. A control panel assembly for home appliances comprising:
    a substrate for fitting at least one switch for operating a home appliance and indicators for indicating operating states of the home appliance, respectively;

an outside film formed such that a user can access the at least one switch and the indicators; and a control panel injection-molded so as to be inserted in and unitized with the outside film, and having a substrate fitted to an inside thereof.

2. The control panel assembly as claimed in claim 1, further comprising an intermediate frame for connecting the outside film to the at least one switch and/or indicators such that the outside film interacts with the at least one switch and/or indicators.

3. The control panel assembly as claimed in claim 2, wherein the intermediate frame includes at least one intermediate button for driving the at least one switch.

4. The control panel assembly as claimed in claim 3, wherein the intermediate frame includes:

a body extending for a certain length, and a leg for connecting the body to the intermediate frame resiliently.

5. The control panel assembly as claimed in claim 4, wherein the leg is a spiral member.

6. The control panel assembly as claimed in claim 3, wherein the intermediate frame further includes reinforcing ribs formed between the at least one intermediate button and a second button.

7. The control panel assembly as claimed in claim 2, wherein the intermediate frame includes at least one supporter for supporting the indicators and guiding indication of the indicators.

8. The control panel assembly as claimed in claim 7, wherein the supporter includes:

an opening opposite to the indicators; and a wall extended in a vertical direction from a circumference of the opening.

9. The control panel assembly as claimed in claim 1, wherein the control panel includes button pass through holes opposite to the at least one switch.

10. The control panel assembly as claimed in claim 1, wherein the control panel includes indicating pass through holes opposite to the indicators.

11. The control panel assembly as claimed in claim 1, wherein the control panel is formed of a transparent or semi-transparent material.

12. The control panel assembly as claimed in claim 11, wherein the control panel is formed of ABS (Acrylonitrile Butadiene Styrene).

13. The control panel assembly as claimed in claim 1, wherein the outside film covers an entire front surface of the control panel.

14. The control panel assembly as claimed in claim 13, wherein the outside film has a continuous surface without holes for prevention of water infiltration into the substrate.

15. The control panel assembly as claimed in claim 1, wherein the outside film includes buttons formed opposite to the at least one switch, and indicator windows opposite to the indicators, wherein
the buttons and the indicator windows have characters and graphics printed together with a predetermined color for assisting use by a user.

16. The control panel assembly as claimed in claim 15, wherein the buttons are projected opposite to the at least one switch so that the at least one switch is operative as the user presses the button.

17. The control panel assembly as claimed in claim 1, wherein the outside film is formed of PET (Polyethylene Terephthalata), or PC (Polycarbonate).

18. A method for fabricating a control panel assembly for home appliances, comprising:

forming an outside film such that a user can put a home appliance into operation and know an operation state;

injection molding resin in the outside film, to form the control panel as one unit with the outside film; and fitting the control panel unitized with the outside film to a substrate, such that the outside film can interact with switches and buttons fitted on the substrate.

19. The method as claimed in claim 18, wherein the step forming the outside film includes the steps of;

printing graphics or characters on a raw film for indicating operations and 10 operation states, and forming the printed film to be in conformity with a predetermined outside form by heat.

20. The method as claimed in claim 19, wherein the film is formed of PC or PET.

21. The method as claimed in claim 19, wherein the graphics or characters are printed such that the graphics or characters indicate intended forms when the graphics or characters are deformed in a thermal formation.

22. The method as claimed in claim 19, wherein forming the printed film includes the steps of; placing the printed film in a mold having a forming surface of a required form, applying heat and pressure to the film such that the film is brought into close contact with the forming surface, maintaining a pressure in the mold for a time period for forming the film to a form opposite to the forming surface, and separating the formed film from the mold.

23. The method as claimed in claim 22, wherein the film is heated by a heating coil provided to the mold.

24. The method as claimed in claim 22, wherein the film is pressed by injection of compressed air into the mold.

25. The method as claimed in claim 19, further comprising the step of trimming a formed edge of the film after forming the printed film.

26. The method as claimed in claim 18, wherein injection molding resin in the outside film injection molding resin in the outside film includes:

placing the formed film in a first mold having recesses opposite to a form of a front surface of the formed film;

coupling a second mold opposite to the first mold with the first mold having the film placed therein, to form a forming cavity between the first mold and the second mold;

injecting resin into the forming cavity; and removing a control panel from the mold, the control panel being formed as the resin is set as one unit with the film.

27. The method as claimed in claim 26, wherein the film is fixed to the recesses in the first mold by vacuum adsorption.

28. The method as claimed in claim 26, wherein coupling a second mold a second mold includes pressing down an edge of the placed film by using a supporting part on the second mold for stable setting of the film.

29. The method as claimed in claim 26, wherein the resin is not injected to parts corresponding to the buttons and the indicator windows formed in the film.

30. The method as claimed in claim 26, wherein the resin is formed of a transparent or semi-transparent material.

31. The method as claimed in claim 30, wherein the resin is ABS.

32. The method as claimed in claim 26, wherein the resin has a melting point lower than the film.

33. The method as claimed in claim 18, further comprising the step of fitting an intermediate frame on the substrate for connecting the outside film to the switches/the buttons before fitting the central panel.

* * * * *